May 30, 1967  D. I. POMERANTZ  3,321,993
MICROMANIPULATOR

Filed Sept. 4, 1964

INVENTOR.
DANIEL I. POMERANTZ
BY
ATTORNEY

May 30, 1967  D. I. POMERANTZ  3,321,993
MICROMANIPULATOR

Filed Sept. 4, 1964  5 Sheets-Sheet 2

INVENTOR.
DANIEL I. POMERANTZ
BY
ATTORNEY

May 30, 1967 D. I. POMERANTZ 3,321,993
MICROMANIPULATOR
Filed Sept. 4, 1964 5 Sheets-Sheet 3

INVENTOR.
DANIEL I. POMERANTZ
BY
ATTORNEY

May 30, 1967  D. I. POMERANTZ  3,321,993
MICROMANIPULATOR

Filed Sept. 4, 1964  5 Sheets-Sheet 4

INVENTOR.
DANIEL I. POMERANTZ
BY
ATTORNEY

May 30, 1967    D. I. POMERANTZ    3,321,993
MICROMANIPULATOR
Filed Sept. 4, 1964    5 Sheets-Sheet 5

INVENTOR.
DANIEL I. POMERANTZ
BY Robert Germo
ATTORNEY

United States Patent Office 3,321,993
Patented May 30, 1967

3,321,993
MICROMANIPULATOR
Daniel I. Pomerantz, Lexington, Mass., assignor to P. R. Mallory & Co., Inc., Indianapolis, Ind., a corporation of Delaware
Filed Sept. 4, 1964, Ser. No. 394,562
18 Claims. (Cl. 74—491)

The present invention relates to micromanipulators, more particularly to a micromanipulator utilized to contact a relatively small area of a semiconducting slice for the purpose of ascertaining the electrical characteristics of slices of semiconducting material such as germanium and silicon and the like. The micromanipulator of the present invention would also have utility in the disposition of miniature items with respect to minature components to be acted upon and for locating such items and components with respect to each other on a work surface.

The device of the present invention is particularly advantageous when utilized in conjunction with electrical measuring and testing equipment. Leads from the electrical testing equipment are coupled to movable probes of the micromanipulator, the probes being utilized to electrically contact the semiconductor slice of a transistor at a predetermined location thereon. The present invention will be described hereinafter as it applies to the measuring and testing of the electrical characteristics of a semiconducting device.

Several micromanipulators presently available are utilized to alter the location of one miniature element with respect to a second miniature element or are utilized to provide a means whereby the base and the emitter wires are located on the germanium or silicon slice. The several micromanipulators utilize complicated means and methods in combination with a microscope to position a wire to be attached to a semiconductor at the bonding area.

Generally, these micromanipulators are satisfactory for limited purposes but are usually bulky, expensive, complicated and slow in operation. The means utilized in obtaining micromovements must be of high precision without play, vibration, and backlash and as frictionless as possible to avoid deleterious jumps and abrupt movements. In testing the electrical characteristics of semiconducting slice, it is imperative that particular areas of the slice be tested, and that the areas already tested not be tested a second time in lieu of untested area on the semiconducting slice. High precision and reliable test results of the electrical characteristics of a semiconducting slice can only be obtained by utilizing equipment that locates a probe at a particular, predetermined position so that this particular location on the semiconducting slice does not overlap with a second, less desirable location thereon and that no two selected areas to be tested to ascertain the electrical characteristics of the slice of semiconducting material be tested twice thereby affording more accurate electrical measurements of the electrical characteristics of the semiconducting slice.

It is therefore, an object of the present invention to provide a micromanipulator that is simple, efficient, inexpensive, accurate and effective to operate.

It is another object of the present invention to provide a micromanipulator that accurately positions a plurality of probes on a workpiece quickly and efficiently.

Still another object of the present invention is to provide a micromanipulator that possesses improved operating characteristics.

Yet another object of the present invention is to provide a micromanipulator that has probes that are substantially linearly positionable on a workpiece which micromanipulator is also simple to fabricate and simple to assemble.

A further object of the present invention is to provide a micromanipulator that has probes in which the movement thereof has a precise amount of travel in response to an actuating force without any overtravel.

Yet another object of the present invention is to provide a micromanipulator that is inexpensive and accurate in construction, and that possesses a movable probe that is more positive in action than preceding micromanipulator probe movements.

Still another object of the present invention is to provide a micromanipulator having optimum reliability characteristics afforded by a construction having a minimum number of parts.

The present invention in another of its aspects, relates to novel features of the instrumentalities of the invention described therein for teaching the principal object of the invention and to the novel principles employed in the instrumentalities whether or not these features and principles may be used in the said object and/or in the said field.

With the aforementioned objects enumerated other objects will be apparent to those persons possessing ordinary skill in the art. Other objects will appear in the following description, appended claims, and appended drawings. The invention resides in the novel construction, combination, arrangement and cooperation of elements as hereinafter described and more particularly as defined in the appended claims.

The appended drawings illustrate several novel and different embodiments of the present invention constructed to function in the most advantageous modes devised for the practical application of the basic principles involved in the hereinafter described invention.

Generally speaking, the present invention relates to means and methods for manipulating microcomponents to a desired location and to positioning a plurality of manipulating probes to desired locations on a micro-workpiece.

The micromanipulator comprises a mounting frame, a plurality of probes utilized to contact selected areas on a workpiece, and an adjusting means utilized to manipulate the probes to and within the selected areas. Each of the probes has associated therewith a chessman that includes a means and method for providing a predetermined horizontal and a predetermined vertical deflection to the probe. A first lever is fixedly coupled to the chessman such that the first lever follows both the vertical and horizontal displacement of the chessman. A second lever is coupled to the first lever by a suitable coupling means. The second lever follows the displacement of the first lever. A probe is fixedly coupled to an extremity of the second lever. A plurality of adjustable guide means are utilized to variably position the first and the second levers to thereby vary a ratio including the displacement of the probe to the displacement of the chessman.

More particularly the present invention is a micromanipulator for contacting selected areas on a workpiece. The probes are manipulated by an adjusting means, which adjusting means includes a chessman, a plurality of rods, and a plurality of guides for the rods. The chessman comprises a base that is horizontally positionable on the mounting frame of the manipulator, a rotatable, threaded male means or bolt fixedly coupled to the base, and a threaded female means or nut cooperating with the threaded bolt. Rotation of the bolt of the chessman vertically displaces the nut, whereas horizontal displacement of the chessman horizontally displaces the nut. A first lever or rod has an extremity fixedly coupled to the nut such that the lever follows the vertical and the horizontal displacement of the nut. A first adjustable guide means is used to guide and determine a fulcrum of the first rod. The guide means includes a truncated, conical aperture through which the first rod projects. A second lever or rod is hingedly coupled to the first rod by a suitable hinge means. The second rod follows the displacement of the first rod. A probe is fixedly coupled to the second rod. A second adjustable guide means is utilized for determining a fulcrum of the second rod. The guide means includes a truncated, conical aperture through which the second rod projects. A means for simultaneously adjusting the first and the second adjustable guide means to simultaneously adjust the fulcrums of the rods to thereby vary a ratio including the displacement of the probe to the displacement of the chessman.

Figure 1:
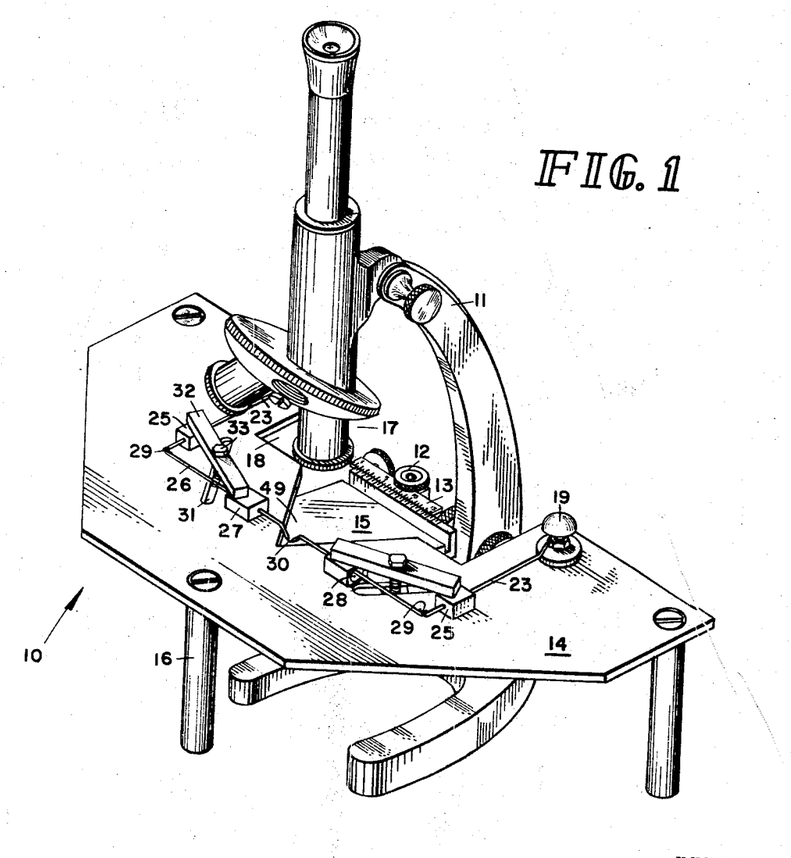
FIGURE 1 is a perspective view of the present invention illustrating the micromanipulator in combination with an image inverting microscope.

Referring now to the drawings, which illustrate the preferred embodiment of the present invention, the micromanipulator is indicated by the numeral 10. The micromanipulator is shown in combination with an image inverting microscope 11. The microscope 11 is positioned on a suitable means (not shown) such as a table, bench, or the like. The microscope is provided with a series of controls 12 and dials or verniers 13 utilized in establishing the position of stage 15 with respect to micromanipulator 10. It is seen that if a predetermined area of the stage is desired to be viewed by the image inverting microscope, the microscope may be provided with a plurality of location finders such as crosshairs that visually locate a plurality of points on the semiconducting material easily and accurately. To align a particular point on the stage underlying the semiconducting material so as to locate points to be tested on the material, the crosshairs are aligned with the particular point on stage 14 as viewed through the microscope by manipulating the microscope controls.

The micromanipulator 11 includes a mounting frame 14 that has a series of legs 16 of predetermined length that are perpendicular to and located at various locations about the periphery of the mounting frame. The legs serve as supports for the mounting frame. The mounting frame is fabricated from any suitable metal such as aluminum. The mounting frame has cut therein a recess portion 17 that may be of any suitable configuration so as to permit advantageous positioning of the microscope with respect to the micromanipulator. As shown in FIGURE 1, a first segment 18 of the recessed portion is substantially rectangular in shape, whereas a second segment 49 adjacent the first segment is substantially V-shaped. It was found these aforementioned shapes were most advantageous for the efficient cooperation between the image inverting microscope and the micromanipulator of the present invention.

A plurality of adjusting means or chessmen 19 are positioned on the mounting frame adjacent the rectangular recessed portion so that at least one chessman is positioned on either side of the rectangular recessed portion. The chessman includes a stove bolt 20 and a base 21 that is fixedly coupled to the screw thread extremity of the bolt. The base 21 has its underside coated with a suitable insulating material 48 such as Teflon and as such the base is slidable about the upper surface of the mounting frame. The chessman is positionable in the horizontal direction on the mounting frame by manually sliding the chessman across the surface of the mounting frame to any desired position. To facilitate the movement of the chessman in the horizontal direction, the aluminum plate is greased with a suitable material. A nut 22 interfits with the screw thread of bolt 20 and rides vertically along the screw thread.

Figures 2, 3:
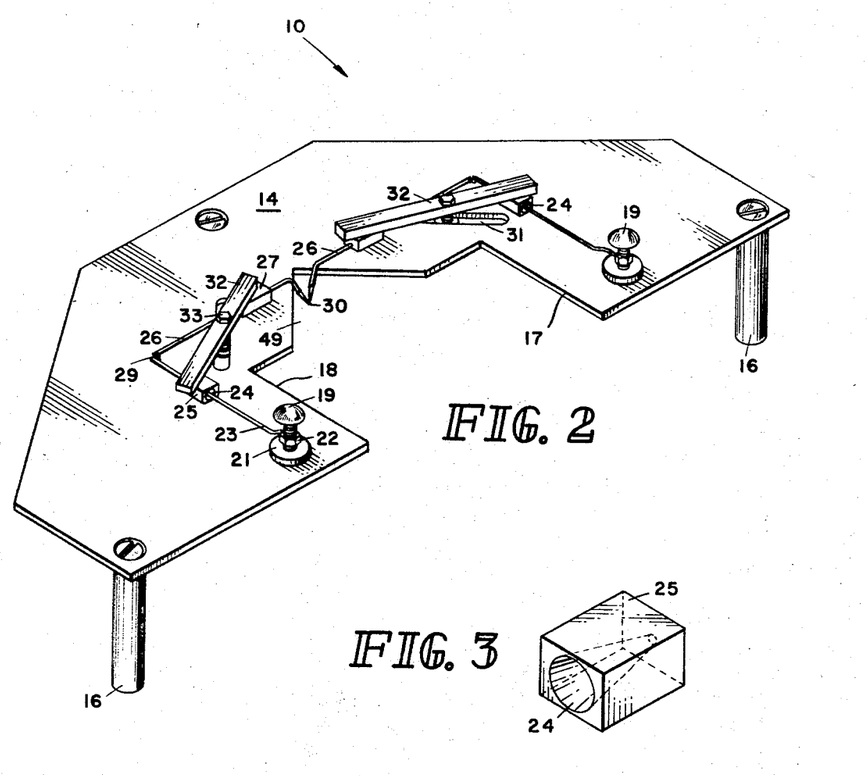
FIGURE 2 is a perspective view of the present invention illustrating the initial position of the adjusting means of the probes.
FIGURE 3 is a perspective view of a guide means utilized to guide the probes in accordance with the commands of the adjusting means.

A lever or rod 23, fabricated from any suitable metal or metal alloy such as Chromel is fixedly attached to a side of the nut by any suitable means such as by welding, soldering, or the like. The diameter of the rod is very small when compared to its length therefore the rod is relatively thin. The rod along its longitudinal axis has a portion thereof that is formed in the shape of an inverted Z. The inverted Z shape permits flexibility in vertical displacement of the rod which will be more apparent from the discussion hereinafter. The rod projects through a truncated conical aperture 24 of guide 25. The guide is fabricated from any suitable insulating material such as Teflon. The largest portion of the aperture in guide 25 faces toward the chessman. It is seen that the smaller portion of the aperture through which the rod projects serves as the fulcrum for either a horizontal or a vertical displacement of the rod. A second rod 26, fabricated from any suitable metal or metal alloy such as Chromel, is hingedly coupled to rod 23 at a right angle thereto and lying in essentially the identical horizontal plane as does rod 23. Rod 26 is hingedly coupled to rod 23 by any suitable hinge means 29 such as an L-shaped resilient metallic piece fabricated from brass stock or the like. The articulated joint formed by the hinge coupling the two associated rods transmits the movements of rod 23 to rod 26. Rod 26 projects through a second rod guide 27 having a truncated conical aperture 28 along the longitudinal axis thereof. The largest portion of the truncated conical aperture is turned toward the hinge means 29. The extremity of the rod 26 projecting through the guide has an L-shaped probe 30 fixedly attached thereto by any suitable means such as welding or the like. The probe is fabricated from any suitable material such as tungsten or the like.

An aperture 31 is formed in the mounting frame at about 45 degree angle with the respective longitudinal planes of the rod guides. An arm 32 has one extremity thereof pivotably coupled to rod guide 25 whereas the other extremity of the arm is pivotably coupled to rod guide 27. A bolt 33 perpendicular to the longitudinal axis of the arm and projecting through an aperture in the arm mates with the threaded portion of a nut 34. A washer 35 separates the nut 34 from the underside of the mounting plate. It is seen by tightening bolt 33 to arm 32 that the guides are securely held in place at a predetermined location on the mounting plate and at a predetermined location with respect to the rods. Also it is seen that repositioning bolt 33 within the aperture 31 will reposition each of the guides on the upper surface of the mounting plate thus altering the fulcrum of rod 23 and the fulcrum of rod 26. Altering the fulcrums of the respective rods alters the ratio of probe motion to chessman motion. It is seen that the mounting frame may have vernier graduations thereon adjacent each of the guides indicative of said ratio.

In operation the semiconducting slice is positioned at a predetermined location on stage 14. The microscope controls are varied until the crosshairs of the microscope and the semiconducting slice correspond at a predetermined location on the semiconducting slice. The stage having the semiconducting slice positioned thereon, is located with respect to the micromanipulator by manipulating the various microscope controls until the desired stage location is achieved.

Figure 4:
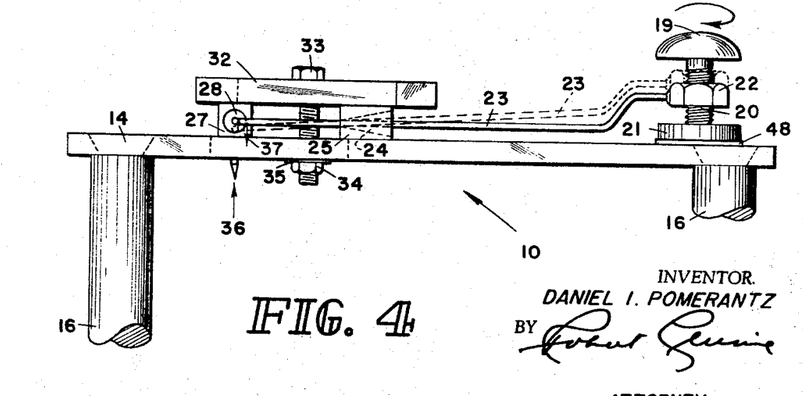
FIGURE 4 is an enlarged, partial side view of the micro-manipulator illustrating the means and methods by which the probe adjusting means alters the vertical position of a probe in full and dotted lines.

Chessman 19 is then manipulated to alter the position of probe 30 so as to bring the probe into contact with the desired area of the semiconducting slice. To displace the probe in the vertical direction as illustrated in FIGURE 4, bolt 20 of the chessman is manually rotated in either the clockwise direction or the counterclockwise direction depending on whether the probe is to be displaced in the upwardly direction as indicated by arrow 36 or to be displaced in the downwardly direction as indicated by arrow 37. The threads of the bolt 20 as shown in FIGURE 4 are so positioned on the bolt that as the bolt is rotated in the clockwise direction, the probe is deflected in the upward direction. Conversely, the threads of the bolt are so positioned that as the bolt is rotated in the counterclockwise direction, the probe will be displaced in the downward direction. It is seen that the positions of guide 25 and guide 27 on the mounting plate with respect to the chessman are determinative of the ratio of the vertical motion experienced by the probe to the motion experienced by the nut of the chessman. Variations in the number of threads per inch on the bolt influences the ratio that exists between the displacement of the probe and the displacement of the chessman. FIGURE 4 illustrates the factor of reduced vertical deflection in full and dotted lines. The respective positions of the rod guides on the mounting frame are of major consideration in determining the ratio of the probe's vertical movement with respect to the vertical movement of the bolt of the chessman.

Figure 5:
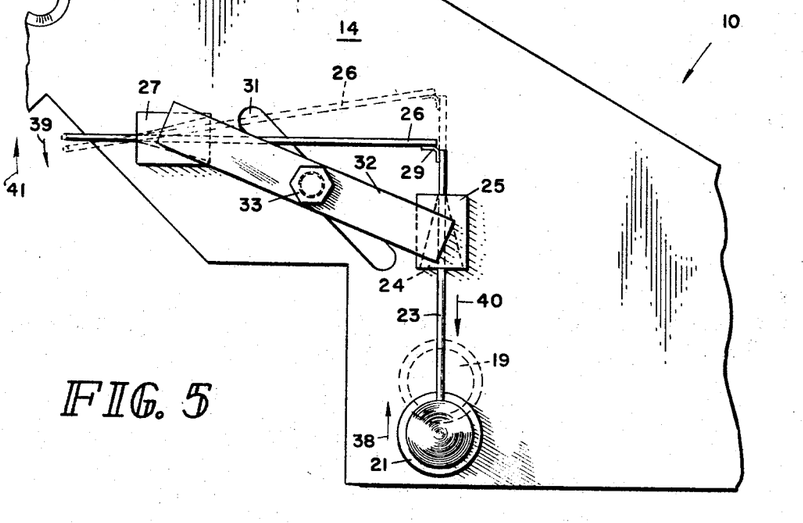
FIGURE 5 is an enlarged, partial top view of the micro-manipulator illustrating movement of the probe adjusting means displaced in a first horizontal direction affecting a horizontal displacement of a probe in a first horizontal direction in full and dotted lines.
Figure 6:
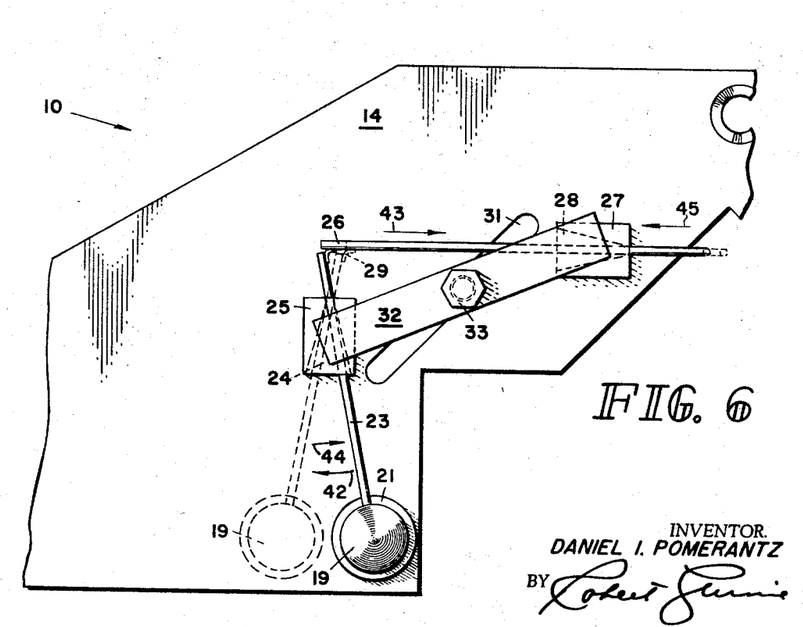
FIGURE 6 is an enlarged, partial top view of the micromanipulator illustrating movement of the probe adjusting means displaced in a second horizontal direction affecting a horizontal displacement of a probe in a second horizontal direction in full and dotted lines.

FIGURE 5 and FIGURE 6 illustrate the means and methods of manipulating the probe in the horizontal direction. Specifically referring to FIGURE 5, the chessman is horizontally displaced in the direction of arrow 38 along the upper face of the greased aluminum mounting frame. As shown by the full lines, rod 23 fixedly coupled to the nut of the chessman is at a right angle with rod 26. As rod 23 is displaced in the direction of arrow 38, the angle between the two rods decreases from an angle of about 90 degrees to a lesser angle, the lesser angle determined by the magnitude of displacement in the direction of arrow 38 by the chessman and the location of the fulcrum of the guide 27. It is seen the closer the proximity of the fulcrum of guide 27 to the hinged joint coupling the respective rods, the greater is the magnitude of displacement experienced by the probe in the direction of arrow 39 with any given movement of the chessman in the direction of arrow 38. As the fulcrum as determined by guide 27 is displaced further from the hinged joint, the lesser is the magnitude of displacement experienced by the probe in the direction of arrow 39 with any given movement of the chessman in the direction of arrow 38. The movement of the chessman in the direction of arrow 38 is shown in full and dotted lines respectively. Assuming the chessman, the respective rods, and the associated probe are in the position of the dotted lines and that it is desired to move the probe to the position of the full lines, the chessman is manually displaced in the direction of arrow 40, likewise deflecting rod 23 in the direction of arrow 40. It is seen that the angle of the hinged coupling increases to become an angle of substantially 90 degrees. In so doing, the probe fixedly coupled to rod 26 is deflected in the direction of arrow 41. The mechanics of the movement of the chessman and the probe are essentially the same as explained hereinbefore with respect to the displacement of the probe in the direction of arrow 39. It is seen the displacement of the chessman could be by either a manual means or by a mechanical means.

FIGURE 6 illustrates the displacement of the probe in a second horizontal direction in full and dotted lines respectively. As the chessman is displaced in the direction of arrow 42, rod 23 fixedly coupled to the chessman is displaced in the direction of arrow 42. As the portion of rod 23 coupled to the chessman is displaced in the direction of arrow 42, rod 26 hingedly coupled to rod 23 is displaced in the direction of arrow 43 thereby displacing the associated probe in the direction of arrow 43. It is seen the closer the proximity of the fulcrum of rod guide 25 to the hinged joint coupling the respective rods, the lesser is the displacement of the probe in the direction of arrow 43 with the identical displacement of the chessman in the direction of arrow 42. As the guide 25 is moved further from the hinge joint coupling the respective rods, the pivot point of the rod 23 as determined by the fulcrum of guide 25 is displaced further from the hinged coupling point. Movement of the fulcrum away from the hinged coupling serves to amplify the displacement of the probe in the direction of arrow 43. The movement of the chessman in the direction of arrow 42 is shown in full and dotted lines respectively. Assuming the chessman, the hinged rods, and the associated probe are in the position of the dotted lines and that it is desired to displace the probe to the position of the full lines, the chessman is manually displaced in the direction of arrow 44 likewise displacing rod 23 in the direction of arrow 44. It is seen that the angle of the hinged coupling decreases to become an angle of substantially less than 90 degrees. In so doing, the probe fixedly coupled to rod 26 is displaced in the direction of arrow 45. The mechanics of the movement of the chessman and the probe are essentially the same as explained hereinbefore with respect to the displacement of the chessman in the direction of arrow 42.

As disclosed hereinbefore, the microscope associated with the micromanipulator of the present invention is an image inverting microscope. When the probe's movement is viewed through the image inverting microscope, the probe appears to be moving in the same direction as that of the chessman, when actually the probe's movement is opposite to the movement of the chessman.

FIGURE 1 and FIGURE 2 illustrate the use of two sets of rods and associated probes. The operation and function of both sets of rods and probes are similar. The use of two sets of rods and associated probes permit the simultaneous probing of various areas on the semiconducting slice or the displacing of the semiconducing slice in either the horizontal direction or vertical direction by each probe grasping the semiconducting slice on either side and displacing the slice to a desired position on the stage.

Figure 7:
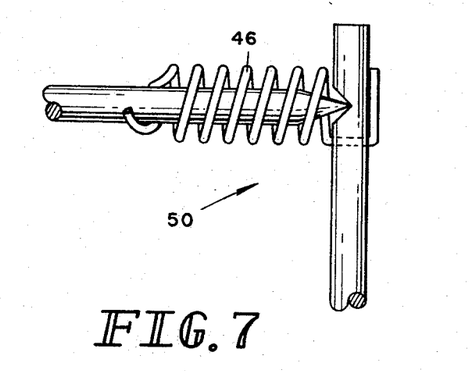
FIGURE 7 is a side view of an embodiment of the present invention whereby a needle bearing, tension spring loaded, is utilized to couple together sections of the micromanipulator.
Figure 8:
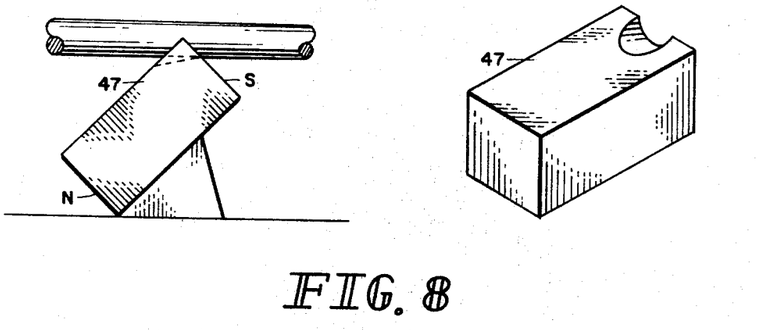
FIGURE 8 is a side view of an embodiment of the present invention wherein a magnetic guide is utilized for constraining a lever to slide in a groove in the magnet.

The embodiments of FIGURE 7 and FIGURE 8 illustrate features not found elsewhere. Referring more particularly to FIGURE 7 a needle bearing coupling 50 is utilized to hingedly couple the rods. A tension spring 46 is wound about one of the rods and has an extremity coupled to the other of said rods as shown in FIGURE 7. The replacement of the hinged coupling with the needle bearing coupling permits a more positive coupling between the rods.

FIGURE 8 illustrates yet another type of guide for the rods. In this embodiment the rods are fabricated of steel and are constrained to slide in the groove of the magnetic guide 47. This groove acts as fulcrum for the rod riding in the groove and thereby replaces the repective Teflon guides. It is seen magnet 47 simplifies assembly and disassembly and therefore is of considerable practical use. The magnetic guides may be equipped with means which will permit variable positioning of the respective guide to thereby permit variable positioning of the fulcrum.

Figure 9:
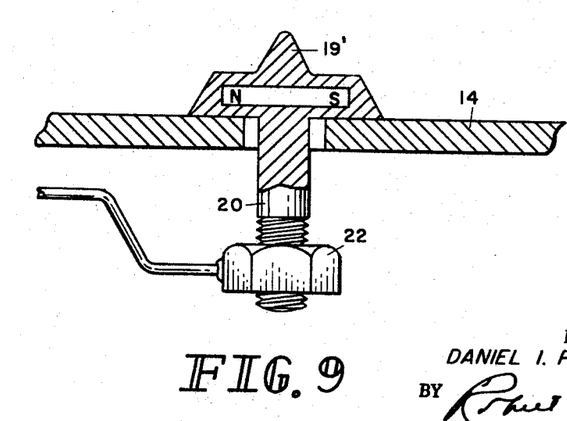
FIGURE 9 is a sectional view of an embodiment of the present invention wherein a magnetic chessman is utilized as an integral part of probe adjusting means.

FIGURE 9 illustrates yet another embodiment of the present invention wherein the chessman is magnetized. The mounting plate is fabricated from steel instead of aluminum as disclosed hereinbefore. Magnetizing the chessman 19' permits the removal of the grease from the surface of the mounting frame thereby eliminating a means that readily gathers foreign objects that are deleterious to the operation of positioning the chessman on the surface of the mounting frame. It is also seen that the threaded portion of the chessman may project through an aperture in the mounting frame. This construction limits the movement of the chessman within specific geographical boundaries on the mounting frame, the boundaries determined by the dimensions of the aperture.

Figure 10:
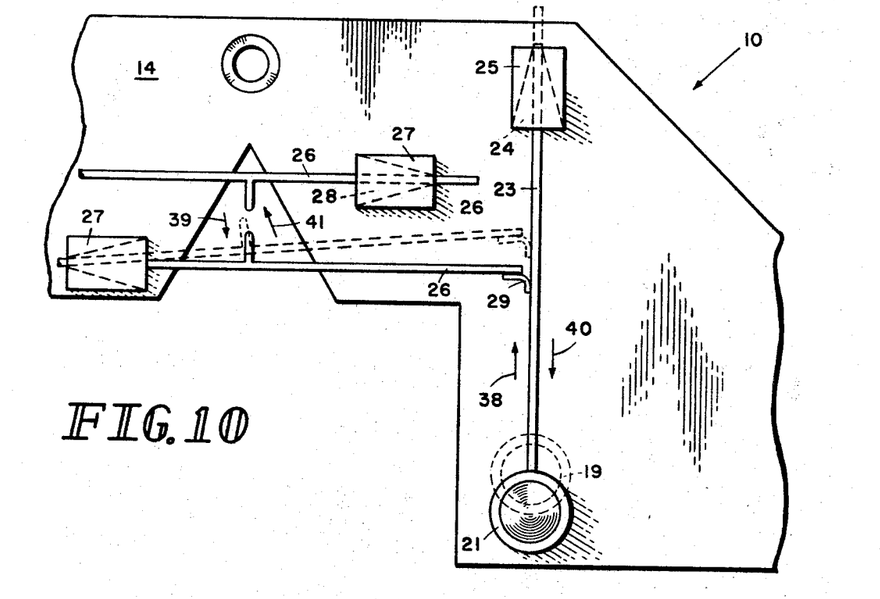
FIGURE 10 is an enlarged, partial top view of an embodiment of the present invention wherein a second class lever is utilized and illustrating the movement of the probe adjusting means in a first horizontal direction in full and dotted lines.
Figure 11:
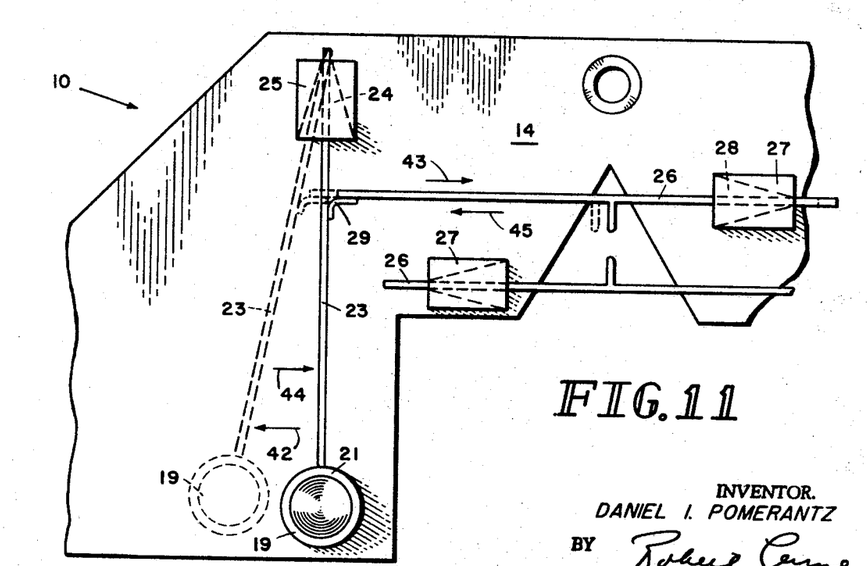
FIGURE 11 is an enlarged, partial top view of an embodiment of the present invention wherein a second class lever is utilized and illustrating the movement of the probe adjusting means in a second horizontal direction in full and dotted lines.

FIGURE 5 and FIGURE 6 illustrate the means and methods of manipulating the probe in the horizontal direction using second class levers. It is seen the discussion hereinbefore of the present invention pertains to the use of first class levers to manipulate the probe in the horizontal direction. A first class lever is a lever that has the fulcrum between the input force and the output force to achieve the necessary translation of the input force. The embodiment of FIGURE 5 and FIGURE 6 use second class levers thereby having the output force between the fulcrum and the input force. As disclosed hereinbefore the fulcrum of rod 23 is determined by guide 25. It was found that an image inverting microscope is not necessary if guide 25 and guide 27 are positioned so that the fulcrum as determined by the respective guides does not fall between the input force and the output force but rather that the output force falls between the fulcrum and the input force as illustrated in FIGURE 10 and FIGURE 11. Specifically referring to FIGURE 10, chessman 19 is horizontally displaced in the direction of arrow 38 along the upper face of the aluminum mounting frame. As shown by the full line, rod 23 fixedly coupled to the nut of the chessman is at a right angle with rod 26. As rod 23 is displaced in the direction of arrow 38, the angle between the two rods decreases from an angle approximating 90 degrees to a lesser angle, the lesser angle determined by the magnitude of displacement in the direction of arrow 38 by the chessman and the location of the fulcrum of guide 27. It is noted that guide 27 is positioned on the mounting frame so as not to fall between the probe and hinge means 29 but rather to be so located to have the probe between the fulcrum of guide 27 and hinge means 29. It is seen the closer the proximity of the fulcrum of guide 27 to the probe, the lesser is the magnitude of displacement experienced by the probe in the direction of arrow 41 with any given movement of the chessman in the direction of arrow 38. As the fulcrum as determined by guide 27 is displaced further from the probe, the greater is the magnitude of displacement experienced by the probe in the direction of arrow 41 with any given movement of the chessman in the direction of arrow 38. The movement of the chessman in the chessman in the direction of arrow 38 is shown in full and dotted lines respectively. Assuming the chessman, the respective rods, and the associated probe are in the position of the dotted lines and that it is desired to move the probe to the position of the full lines, the chessman is manually displaced in the direction of arrow 40, likewise deflecting rod 23 in the direction of arrow 40. It is seen that the angle of the hinged coupling increases to become an angle of substantially 90 degrees. In so doing, the probe fixedly coupled to rod 26 is deflected in the direction of arrow 39. The mechanics of the movement of the chessman and the probe are essentially the same as explained hereinbefore with respect to the displacement of the probe in the direction of arrow 41. It is seen the displacement of the chessman could be by either a manual means or by a mechanical means.

FIGURE 11 illustrates the displacement of the probe in a second horizontal direction in full and dotted lines respectively. As the chessman is displaced in the direction of arrow 42, rod 23 fixedly coupled to the chessman is displaced in the direction of arrow 42. As the portion of the rod 23 coupled to the chessman is displaced in the direction of arrow 42, rod 26 hingedly coupled to rod 23 is displaced in the direction of arrow 45 thereby displacing the associated probe in the direction of arrow 45. As shown in FIGURE 11 guide 25 is so positioned so as not to fall between the chessman and the hinge means 29. It is seen the closer the proximity of the fulcrum of rod guide 25 to the hinged joint coupling the respective rods, the less is the displacement of the probe in the direction of arrow 45 with the identical displacement of the chessman in the direction of arrow 42. As guide 25 is moved further from the hinged joint coupling the respective rods, the pivot point of rod 23 as determined by the fulcrum of guide 25 is displaced further from the hinged coupling point. Movement of the fulcrum away from the hinged coupling serves to amplify the displacement of the probe in the direction of arrow 43. The movement of the chessman in the direction of arrow 42 is shown in full and dotted lines respectively. Assuming the chessman, the hinged rods, and the associated probe are in the position of the dotted lines and that it is desired to displace the probe to the position of the full lines, the chessman is manually displaced in the direction of arrow 44 likewise displacing rod 23 in the direction of arrow 44. It is seen that the angle of the hinged coupling decreases to become an angle of substantially less than 90 degrees. In so doing, the probe fixedly coupled to rod 26 is displaced in the direction of arrow 43. The mechanics of the movement of the chessman and the probe are essentially the same as disclosed hereinbefore with respect to the displacement of the chessman in the direction of arrow 42.

While the invention is illustrated and described in its preferred embodiments, it will be understood that modifications and variations may be effected without departing from the scope of the novel concepts of this invention as set forth in the appended claims.

Thus having described my invention, I claim:

1. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probe to said selected areas, said adjusting means including a chessman means, said chessman means including means for providing a horizontal and a vertical displacement of said probe, a first lever means fixedly coupled to said chessman means such that said first lever means follows said vertical and said horizontal displacement of said chessman means, a second lever means coupled to said first lever means by a coupling means, said second lever following said displacement of said first lever, a probe fixedly coupled to said second lever, and a plurality of adjustable guide means for variably positioning fulcrums of said first and said second lever means to thereby vary a ratio including said displacement of said probe to said displacement of said chessman means.

2. In combination a microscope and a micromanipulator for connecting selected areas on a workpiece, said micromanipulator comprising: a mounting frame; a plurality of probes utilized to contact said selected areas, each of said probes manipulated by means comprising an adjusting means for initiating said manipulation of said probe to said selected areas, said adjusting means including a chessman means, said chessman means including means for providing a horizontal and a vertical displacement, a first rod fixedly coupled to said chessman means such that said first rod means follows said vertical and said horizontal displacement of said chessman means, a second rod means hingedly coupled to said first rod means by a coupling means, said second rod following said displacement of said first rod, a probe fixedly coupled to said second rod, and a plurality of adjustable guide means for variable positioning fulcrums of said first and said second rod means to thereby vary a ratio including said displacement of said probe to said displacement of said chessman means.

3. In combination an image inverting microscope and a micromanipulator for contacting selected areas on a workpiece, said micromanipulator comprising: a mounting frame; a plurality of probles utilized to contact said selected areas, each of said probes manipulated by means comprising an adjusting means for initiating said manipulation of said probe to said selected areas, said adjusting means including a chessman means, said chessman means including means for providing a horizontal and a vertical displacement of said probe, a first lever means fixedly coupled to said chessman means such that said first lever means follows said vertical and said horizontal displacement of said chessman means, a second lever means coupled to said first lever means by a coupling means, said second lever following said displacement of said first lever, a probe fixedly coupled to said second lever, and a plurality of adjustable guide means, each guide means including an aperture through which one of said lever means projects, said guide means variably positioning fulcrums of said first and said second lever means to thereby vary a ratio including said displacement of said probe to said displacement of said chessman means, said fulcrum of said first lever located between said chessman and said coupling means, said fulcrum of said second lever located between said coupling means and said probe.

4. In combination an image inverting microscope and a micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probe to said selected areas, said adjusting means including a chessman means, said chessman means including means for providing displacement in a first direction and a displacement in a second direction of said probes, a first lever means fixedly coupled to said chessman means such that said first lever means follows said displacement of said chessman means, a second lever means coupled to said first lever means by a coupling means, said second lever following said displacement of said first lever, a probe fixedly coupled to said second lever, and a plurality of adjustable guide means for variably positioning fulcrums of said first and said second lever means to thereby vary a ratio including said displacement of said probe to said displacement of said chessman means, said fulcrum of said first lever located between said chessman and said coupling means, said fulcrum of said second lever located between said coupling means and said probe.

5. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probe to said selected areas, said adjusting means including a magnetic chessman means, said chessman means including means for providing a horizontal and a vertical displacement of said probe, a first lever means fixedly coupled to said chessman means such that said first lever means follows said vertical and said horizontal displacement of said chessman means, a second lever means magnetically coupled to said first lever means by a coupling means, said second lever following said displacement of said first lever, a probe fixedly coupled to said second lever, and a plurality of adjustable guide means for variably positioning fulcrums of said first and said second lever means to thereby vary a ratio including said displacement of said probe to said displacement of said chessman means.

6. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probe to said selected areas, said adjusting means including a chessman means, said chessman means including means for providing displacement in a first direction and a displacement in a second direction of said probe, a first rod means fixedly coupled to said chessman means such that said first rod means follows said displacement of said chessman means, a second rod means hingedly coupled to said first rod means by a coupling means, said second rod following said displacement of said first rod, a probe fixedly coupled to said second rod, and a plurality of adjustable guide means, each guide means including an aperture through which one of said rod means projects, said guide means variably positioning fulcrums of said first and said second rod means to thereby vary a ratio including said displacement of said probe to said displacement of said chessman means.

7. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base, a male means fixedly coupled to said base, a female means cooperating with said male means such that displacement in a first direction by said male means vertically displaces said female means, and displacement of said male means in a second direction thereby horizontally displacing said female means, a first lever means including an extremity fixedly coupled to said female means such that said first lever follows said displacement of said female means, a first adjustable guide means for determining a fulcrum of said first lever means, a second lever pivotably coupled to said first lever means by a coupling means, said second lever following said displacement of said first lever, a probe fixedly coupled to said second lever, a second adjustable guide means for determining a fulcrum of said second lever means, and means for simultaneously adjusting said first and said second adjustable guide means to simultaneously adjust said fulcrums of said levers to thereby vary a ratio including said displacement of said probe to said displacement of said chessman.

8. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base, male means fixedly coupled to said base, a female means cooperating with said male means such that displacement in a first direction of said male means displaces said female means in said first direction, and displacement of said male means in a second direction thereby displaces said female means in said second direction, a first lever means including an extremity fixedly coupled to said female means such that said first lever follows said displacement of said female means, a first adjustable guide means including an aperture through which said first lever means projects, said aperture determining a fulcrum of said first lever means, a second lever pivotably coupled to said first lever means by a coupling means, said second lever following said displacement of said first lever, a probe fixedly coupled to said second lever, a second adjustable guide means including an aperture through which said first lever means projects, said aperture determining a fulcrum of said second lever means, and means for simultaneously adjusting said first and said second adjustable guide means to simultaneously adjust said fulcrums of said levers to thereby vary a ratio including said displacement of said probe to said displacement of said chessman.

9. A micromanipulator for contacting selected areas on a workpiece, said micromanipulator comprising: a mounting frame; a plurality of probes utilized to contact said selected areas, each of said probes manipulated by means comprising: an adjusting means for initiating said manipulation of said probes to said selected areas, said adjusting means including a chessman comprising a base, a male means fixedly coupled to said base, a female means cooperating with said male means such that displacement in a first direction of said male means displaces said female means in said first direction, and displacement of said male means in a second direction thereby displaces said female means in said second direction, a first lever means including an extremity fixedly coupled to said female means such that said first lever follows said displacement of said female means, a first adjustable guide means including a truncated conical aperture through which said first lever means projects, said aperture determining a fulcrum of said first lever means, a second lever pivotably coupled to said first lever means by a coupling means, said second lever following said displacement of said first lever, a probe fixedly coupled to said second lever, a second adjustable guide means including a truncated conical aperture through which said first lever means projects, said aperture determining a fulcrum of said second lever means, and means for simultaneously adjusting said first and said second adjustable guide means to simultaneously adjust said fulcrums of said levers to thereby vary a ratio including said displacement of said probe to said displacement of said chessman.

10. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base horizontally positionable on said mounting frame, a rotatable threaded male means fixedly coupled to said base, a threaded female means cooperating with said threaded male means such that rotation by said male means vertically displaces said female means, and horizontal displacement of said male means horizontally displaces said female means, a first lever means including an extremity fixedly coupled to said female means such that said first lever follows said vertical and said horizontal displacement of said female means, a first adjustable guide means for determining a fulcrum of said first lever means, a second lever pivotably coupled to said first lever means by a coupling means, said second lever following said displacement of said first lever, a probe fixedly coupled to said second lever, a second adjustable guide means for determining a fulcrum of said second lever means, and means for simultaneously adjusting said first and said second adjustable guide means to simultaneously adjust said fulcrums of said levers to thereby vary a ratio including said displacement of said probe to said displacement of said chessman.

11. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a base horizontally positionable on said mounting frame, a rotatable threaded male means fixedly coupled to said base, a threaded female means cooperating with said threaded male means such that rotation by said male means vertically displaces said female means, and horizontal displacement of said male means horizontally displaces said female means, a first rod including an extremity fixedly coupled to said female means such that said first lever follows said vertical and said horizontal displacement of said female means, a first adjustable guide means for determining a fulcrum of said first rod, a second rod hingedly coupled to said first rod by a hinge means, said second rod following said displacement of said first rod, a probe fixedly coupled to said second rod, a second adjustable guide means for determining a fulcrum of said second rod means, and means for simultaneously adjusting said first and said second adjustable guide means to simultaneously adjust said fulcrums of said rods to thereby vary a ratio including said displacement of said probe to said displacement of said chessman.

12. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base horizontally positionable on said mounting frame, a rotatable threaded bolt fixedly coupled to said base, a threaded nut cooperating with said threaded bolt such that rotation by said bolt vertically displaces said nut, and horizontal displacement of said chessman horizontally displaces said nut, a first lever means including an extremity fixedly coupled to said female means such that said first lever follows said vertical and said horizontal displacement of said female means, a first adjustable guide means for determining a fulcrum of said first lever means, a second lever pivotably coupled to said first lever means by a coupling means, said second lever following said displacement of said first lever, a probe fixedly coupled to said second lever, a second adjustable guide means for determining a fulcrum of said second lever means, and means for simultaneously adjusting said first and said second adjustable guide means to simultaneously adjust said fulcrums of said levers to thereby vary a ratio including said displacement of said probe to said displacement of said chessman.

13. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base horizontally positionable on said mounting frame, a rotatable threaded bolt fixedly coupled to said base, a threaded nut cooperating with said threaded bolt such that rotation by said bolt vertically displaces said nut, and horizontal displacement of said chessman horizontally displaces said nut, a first rod including an extremity fixedly coupled to said nut such that said first lever follows said vertical and said horizontal displacement of said nut, a first adjustable guide means for determining a fulcrum of said first rod, a second rod hingedly coupled to said first rod by a hinge means, said second rod following said displacement of said first rod, a probe fixedly coupled to said second rod, a second adjustable guide means for determining a fulcrum of said second rod means, and means for simultaneously adjusting said first and said second adjustable guide means to simultaneously adjust said fulcrums of said rods to thereby vary a ratio including said displacement of said probe to said displacement of said chessman.

14. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probe to said selected areas, said adjusting means including a chessman means, said chessman means including means for providing a horizontal and a vertical displacement of said probe, a first lever means fixedly coupled to said chessman means such that said first lever means follows said vertical and said horizontal displacement of said chessman means, a second lever means coupled to said first lever means by a coupling means, said second lever following said displacement of said first lever, a probe fixedly coupled to said second lever, and a plurality of adjustable guide means for variably positioning fulcrums of said first and said second lever means to thereby vary a ratio including said displacement of said probe to said displacement of said chessman means, said first lever having said coupling means positioned between said fulcrum of said first lever and said chessman, said second lever having said probe positioned between said fulcrum of said second lever and said coupling means.

15. In combination an image inverting microscope and a micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base, male means fixedly coupled to said base, a female means cooperating with said male means such that displacement in a first direction by said male means vertically displaces said female means, and displacement of said male means in a second direction thereby horizontally displacing said female means, a first lever means including an extremity fixedly coupled to said female means such that said first lever follows said displacement of said female means, a first adjustable guide means for determining a fulcrum of said first lever means, said fulcrum of said first lever located between said chessman and a coupling means, a second lever pivotably coupled to said first lever means by said coupling means, said second lever following said displacement of said first lever, a probe fixedly coupled to said second lever, a second adjustable guide means for determining a fulcrum of said second lever means, said fulcrum of said second lever located between said coupling means and said probe, and means for simultaneously adjusting said first and said second adjustable guide means to simultaneously adjust said fulcrums of said levers to thereby vary a ratio including said displacement of said probe to said displacement of said chessman.

16. In combination an image inverting microscope and a micromanipulator for contacting selected areas on a workpiece, said mcromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base, male means fixedly coupled to said base, a female means cooperating with said male means such that displacement in a first direction by said male means vertically displaces said female means, and displacement of said male means in a second direction thereby horizontally displacing said female means, a first lever means including an extremity fixedly coupled to said female means such that said first lever follows said displacement of said female means, a first adjustable guide means for determining a fulcrum of said first lever means, said fulcrum of said first lever located between said chessman and a coupling means, a second lever pivotably coupled to said first lever means by said coupling means, said second lever following said displacement of said first lever, a probe fixedly coupled to said second lever, a second adjustable guide means for determining a fulcrum of said second lever means, said fulcrum of said second lever located between said coupling means and said probe, and means for simultaneously adjusting said first and said second adjustable guide means to simultaneously adjust said fulcrums of said levers to thereby vary a ratio including said displacement of said probe to said displacement of said chessman.

17. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base, male means fixedly coupled to said base, a female means cooperating with said male means such that displacement in a first direction by said male means vertically displaces said female means, and displacement of said male means in a second direction thereby horizontally displacing said female means, a first lever means including an extremity fixedly coupled to said female means such that said first lever follows said displacement of said female means, a first adjustable guide means for determining a fulcrum of said first lever means, said first lever having a coupling means positioned between said fulcrum of said first lever and said chessman, a second lever pivotably coupled to said first lever means by said coupling means, said second lever following said displacement of said first lever, a probe fixedly coupled to said second lever, a second adjustable guide means for determining a fulcrum of said second lever means, said second lever having said probe positioned between said fulcrum of said second lever and said coupling means, and means for simultaneously adjusting said first and said second adjustable guide means to simultaneously adjust said fulcrums of said levers to thereby vary a ratio including said displacement of said probe to said displacement of said chessman.

18. A micromanipulator for contacting selected areas on a workpiece, said micromanipulator comprising: a mounting frame; a plurality of probes utilized to contact said selected areas, each of said probes manipulated by means comprising an adjusting means for initiating said manipulation of said probes to said selected areas, said adjusting means including a chessman comprising a base, male means fixedly coupled to said base, a female means cooperating with said male means such that displacement in a first direction by said male means vertically displaces said female means, and displacement of said male means in a second direction thereby horizontally displacing said female means, a first lever means including an extremity fixedly coupled to said female means such that said first lever follows said displacement of said female means, a first adjustable magnetic guide means for determining a fulcrum of said first lever means, said first lever having a coupling means positioned between said fulcrum of said first lever and said chessman, a second lever pivotably coupled to said first lever means by said coupling means, said second lever following said displacement of said first lever, a probe fixedly coupled to said second lever, a second adjustable magnetic guide means for determining a fulcrum of said second lever means, said second lever having said probe positioned between said fulcrum of said second lever and said coupling means, and means for simultaneously adjusting said first and said second adjustable guide means to simultaneously adjust said fulcrums of said levers to thereby vary a ratio including said displacement of said probe to said displacement of said chessman.

References Cited

UNITED STATES PATENTS

| | | | |
|---|---|---|---|
| 2,545,258 | 3/1951 | Cailloux | 214—1 |
| 2,603,892 | 7/1952 | Fischer | 214—1 |
| 3,188,879 | 6/1965 | Conley | 74—491 |
| 3,276,604 | 10/1966 | Lemer | 74—491 |

FRED C. MATTERN, JR., *Primary Examiner.*

W. S. RATLIFF, *Assistant Examiner.*